(12) United States Patent
Frank

(10) Patent No.: US 8,978,459 B2
(45) Date of Patent: Mar. 17, 2015

(54) EQUIPMENT FOR MEASURING THE INFLATION PRESSURE OF A TIRE OF A VEHICLE WHEEL

(71) Applicant: Messier-Bugatti-Dowty, Velizy Villacoublay (FR)

(72) Inventor: David Frank, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 14/015,074

(22) Filed: Aug. 30, 2013

(65) Prior Publication Data

US 2014/0060168 A1    Mar. 6, 2014

(30) Foreign Application Priority Data

Aug. 30, 2012   (FR) ...................................... 12 58127

(51) Int. Cl.
| | | |
|---|---|---|
| *B60C 23/02* | (2006.01) | |
| *G01L 7/16* | (2006.01) | |
| *G01L 9/00* | (2006.01) | |
| *G01L 17/00* | (2006.01) | |
| *B60C 23/06* | (2006.01) | |

(52) U.S. Cl.
CPC ................. *B60C 23/02* (2013.01); *G01L 7/166* (2013.01); *G01L 9/0089* (2013.01); *G01L 17/00* (2013.01); *B60C 23/06* (2013.01)
USPC ...................................................... 73/146.2

(58) Field of Classification Search
USPC ................................................. 73/146–146.8
See application file for complete search history.

(56) References Cited

U.S. PATENT DOCUMENTS

| | | | | | |
|---|---|---|---|---|---|
| 4,975,679 | A | * | 12/1990 | Ballyns | ......................... 340/442 |
| 5,055,826 | A | * | 10/1991 | Ballyns | ......................... 340/442 |
| 5,119,066 | A | * | 6/1992 | Ballyns | ......................... 340/442 |
| 5,983,728 | A | | 11/1999 | Weng | |

FOREIGN PATENT DOCUMENTS

| | | |
|---|---|---|
| DE | 25 18 859 A1 | 11/1976 |
| FR | 2 483 610 A1 | 12/1981 |
| FR | 2 558 256 A1 | 7/1985 |
| JP | 2002-333378 A | 11/2002 |

OTHER PUBLICATIONS

French Preliminary Search Report Dated May 7, 2013.

* cited by examiner

*Primary Examiner* — Andre Allen
(74) *Attorney, Agent, or Firm* — Sughrue Mion, PLLC

(57) ABSTRACT

Measurement equipment for measuring the inflation pressure of a tire of a vehicle wheel 1. The equipment comprises a body 16 defining an internal volume, a communication orifice 19 for putting the inside volume of the body 16 into communication with an inflation chamber situated between a rim 2 and a tire of the wheel and containing an inflation gas and an indicator member 25 slidably mounted in the body 16 so as to define a gastight separation between a first chamber 26 containing a given quantity of a reference gas and a second chamber 27 into which the communication orifice 19 leads. As a result, the indicator member 25 is subjected to opposing pressures that exist in each of the chambers. A position-identification device 30 is operative to identify the position of the indicator member in the body.

8 Claims, 2 Drawing Sheets

EQUIPMENT FOR MEASURING THE INFLATION PRESSURE OF A TIRE OF A VEHICLE WHEEL

The invention relates to equipment for measuring the inflation pressure of a tire of a vehicle wheel.

BACKGROUND OF THE INVENTION

Most modern aircraft have landing gear that includes measurement means for measuring values of parameters that are monitored in order to ensure that the landing gear is used under conditions that enable predetermined safety, maintenance, and operating cost targets to be reached. By way of example, the parameters that are measured may be brake temperature, carbon disk wear when the brakes are carbon disk brakes, the pressure and the temperature of shock absorbers in the landing gear, the pressure of the gas inflating the tires of wheels, etc.

The gas pressure in the tires of wheels of an aircraft constitutes a parameter that is particularly critical, and it needs to be monitored regularly. On takeoff, a tire that is under-inflated, or indeed over-inflated, presents a major risk of bursting and projecting debris that might damage various pieces of equipment of the aircraft. In addition, regular use of tires that are under-inflated or over-inflated leads to premature wear of the tires, and thus to large extra operating costs.

It is nowadays mandatory to measure the pressure of each tire of an aircraft's wheels before each flight. For this purpose, it is either possible to provide the aircraft with onboard means enabling pressure to be measured continuously and enabling pressure measurements to be transmitted to the cockpit, or else to take measurements manually during maintenance operations while the airplane is on the ground. In both situations, use is made of a duct provided in the rim of each wheel, similar to that used for inflating the tire, which duct serves to put the inside of the tire into communication with a pressure sensor.

The measured pressure value is naturally highly dependent on the temperature of the gas, which itself depends on outside temperature, and which may be influenced to a large extent by energy from a braking operation prior to taking the measurement, etc.

It is thus essential either to correct the pressure measurement as a function of temperature, or to define thresholds that depend on temperature beyond which the tire needs to be reinflated or deflated. For this purpose, it is necessary to measure or to evaluate the temperature of the tire when measuring its pressure, thereby making onboard means more complex or lengthening the time taken for maintenance operations. An estimate of the inflation pressure of a tire can thus be obtained very simply on the basis of the position of an indicator member.

OBJECT OF THE INVENTION

An object of the invention is to enable the pressure of a tire to be measured without requiring a correction to be made as a function of temperature.

SUMMARY OF THE INVENTION

In order to achieve this object, the invention provides measurement equipment for measuring the inflation pressure of a tire of a vehicle wheel, the equipment comprising:
a body defining an internal volume;
a communication orifice for putting the inside volume of the body into communication with an inflation chamber situated between a rim and a tire of the wheel and containing an inflation gas;
an indicator member slidably mounted in the body so as to define a gastight separation between a first chamber containing a given quantity of a reference gas and a second chamber into which the communication orifice leads, such that the indicator member is subjected to opposing pressures that exist in each of the chambers; and
position-identification means for identifying the position of the indicator member in the body.

Thus, since the reference gas and the inflation gas are raised to temperatures that are substantially equal by virtue of their proximity, the effects of those temperatures on the opposing pressures exerted on the indicator member are very close and therefore they compensate. As a result, the position of the indicator member in the body does not depend on temperature. The pressure in the tire can thus be deduced simply from the position of the indicator member in the body without any need to correct the measurement of tire pressure as a function of temperature.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
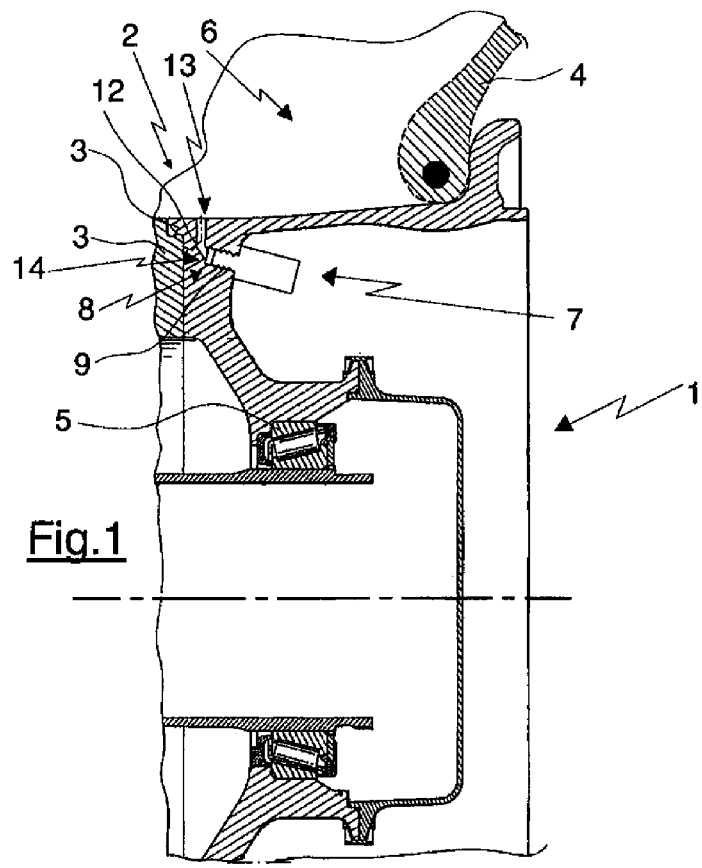
FIG. 1 is a fragmentary section view of a wheel of an aircraft undercarriage fitted with pressure measurement equipment of the invention.

With reference to FIG. 1 and in conventional manner, a wheel 1 of an aircraft undercarriage has a rim 2 made up of two half-rims 3 receiving a tire 4 (represented diagrammatically by dashed lines). The rim 2 is rotatably mounted by means of conical roller bearings 5 in this example (only one bearing is visible). Between the rim 2 and the tire 4 of the wheel 1 there extends an inflation chamber 6 filled with an inflation gas, generally nitrogen. Pressure measurement equipment 7 of the invention is installed on one of the half-rims 3 in order to measure the inflation pressure that exists inside the inflation chamber 6. The pressure measurement equipment 7 is screwed into an assembly orifice 8 that defines tapping 9.

It should be observed that at this point that since the pressure measurement equipment is designed to be screwed directly to the rim, it is necessary to install it before inflating the tire (and to wait for the tire to be deflated before unscrewing it). It is naturally possible to make provision for using intermediate equipment having a valve that is permanently screwed to the rim, thus making it possible to install and remove the measurement equipment without deflating the tire.

In order to put the inflation chamber 6 into communication with the measurement equipment 7, the rim 2 has a duct 12 with a first end 13 leading into the inflation chamber 6 and a second end 14 leading into the assembly orifice 8. The duct 12, similar to the ducts that are used for inflating the tires, serves to put the inflation chamber 6 into communication with the pressure measurement equipment 7 so that the equipment is subjected to an inflation pressure close to the pressure that exists inside the inflation chamber.

Figures 2A, 2B:
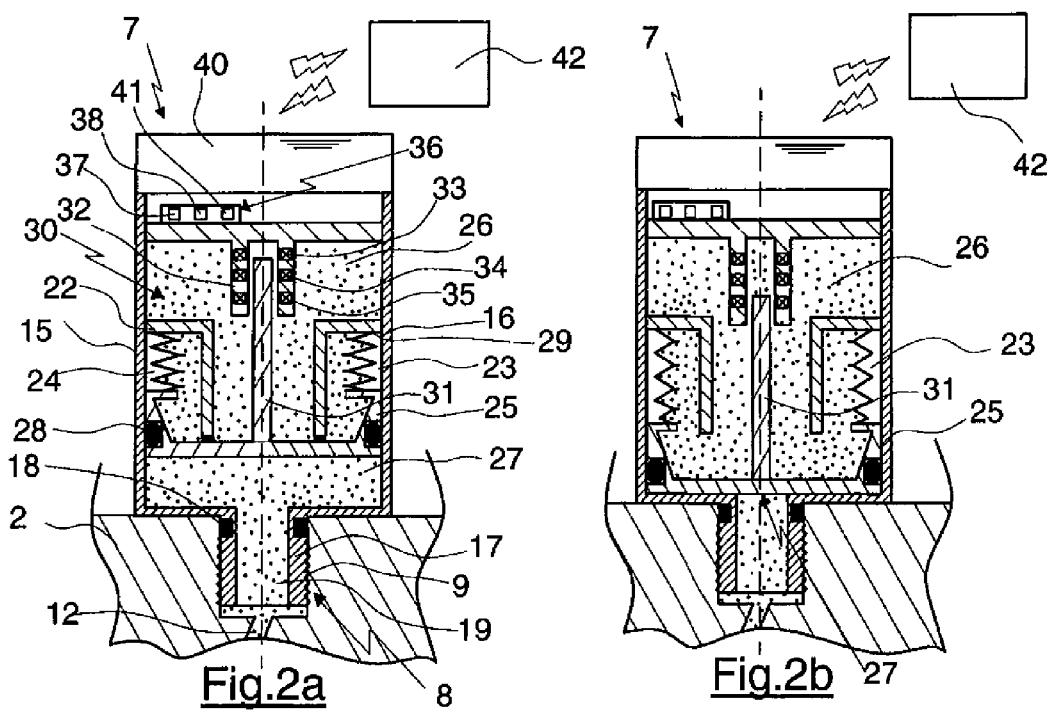
FIG. 2a is a longitudinal section view of pressure measurement equipment of the invention in a first embodiment, a piston of the equipment being in a retracted position.
FIG. 2b is a longitudinal section view of pressure measurement equipment of the invention in a first embodiment, the piston of the embodiment being in an extended position.

With reference to FIGS. 2a and 2b, the pressure measurement equipment 7 in a first embodiment comprises a body 16 projecting from the rim 2 and an assembly endpiece 17 that is threaded in part in order to co-operate with the tapping 9 in the assembly orifice 8. The assembly endpiece 17 has a sealing gasket 18, in this example an O-ring, serving to provide sealing between the duct 12 and the outside of the wheel in order to prevent the tire 4 from deflating when the pressure measurement equipment 7 is installed. An opening 19 is made in the assembly end so as to enable a certain quantity of inflation gas to penetrate into the inside of the body 16 via the duct 12.

The body 16 defines an inside volume in which a piston 25 is mounted to slide in sealed manner, providing a leaktight separation between a first chamber 26 and a second chamber 27. Movement of the piston 25 is limited by a sleeve 22 mounted stationary in the inside volume of the body 16. In order to provide sealing between the first chamber 26 and the second chamber 27, the piston 25 is provided with a sealing gasket 28, in this example an O-ring. The piston 25 is also secured to the sleeve 22 via a bellows 23 that extends in an annular space 24 defined between the sleeve 22 and the body 16. The bellows 23 serves to prevent any exchange of gas between the first chamber 26 and the second chamber 27 of the body 16.

The first chamber 26 of the body 16 is prefilled with a given quantity of a reference gas (e.g. nitrogen or helium). Prefilling is performed prior to mounting the measurement equipment on the wheel rim (e.g. during manufacture of the measurement equipment). By means of the bellows 23, the quantity of reference gas contained in the first chamber is kept constant.

The second chamber 27, into which the opening 19 leads, becomes filled with inflation gas when the tire of the wheel is inflated, such that when the tire is inflated the pressure inside the second chamber is equal to the inflation pressure of the tire.

The piston 25 is then subjected to opposing pressures as exerted by the reference gas and by the inflation gas. The piston 25 then takes up a position depending on the value of the inflation pressure. It is thus possible to determine the value of the inflation pressure by determining the position of the piston 25.

It should be observed at this point that since the inflation gas and the reference gas are taken to temperatures that are substantially identical as a result of their proximity, the effects of such temperatures on the opposing pressures exerted on the piston 25 are very close and they compensate each other. The position of the piston 25 in the body 16 therefore does not depend on temperature, and as a result there is no need to correct the measurement of tire pressure.

Thus, in FIG. 2a, the piston 25 is shown in a so-called "retracted" position corresponding to an inflation pressure that is great enough for the inflation pressure to push back the piston 25 so that it comes to bear against the sleeve 22, whereby the volume of the first chamber 26 is at a minimum while the volume of the second chamber 27 is at a maximum.

Conversely, in FIG. 2b, the piston 25 is shown in a so-called "extended" position corresponding to an inflation pressure that is small enough to allow the pressure exerted by the reference gas to push back the piston 25 into abutment against the end of the body 16, such that the volume of the first chamber 26 is at a maximum and the volume of the second chamber 27 is practically zero.

Naturally, if the tire is properly inflated, then the piston 25 finds an equilibrium position that is intermediate between those two extreme positions.

In order to determine the position of the piston 25, a linear variable differential transformer (LVDT) type sensor 30 is used that is made up of a metal rod 31 secured to the piston 25 of the bellows 23, and of a hollow measurement element 23 of external outside shape. In the measurement element 32 there are arranged three coils on a common axis: one primary coil 33 and two secondary coils 34 and 35. The coils 33, 34, and 35 are electrically connected to an electrical module 36 (the electrical connections are not shown in order to simplify the figure), which module has generator means 37 for applying a voltage to the primary coil 33, and measurement means 38 for measuring the voltages on the secondary coils 34 and 35, which voltages depend on the extent to which the metal rod 31 is pushed into the measurement element 32, and thus on the position of the piston 25.

The electrical module 36 is also connected to an antenna 40 of the measurement equipment 7 and includes transmitter means 41 arranged to format the measurements performed by the linear movement sensor 30 and to transmit them over a radio connection via the antenna 40. This data is transmitted to communications equipment 42 situated on the aircraft or brought up to the proximity of the wheel 1 by an operator on the ground.

It should be observed that an electrical power supply for the electrical module 36 and the linear movement sensor 30 can be provided by various means that are not shown herein, e.g. by transmitting electrical energy over a radiofrequency connection, or by means of a battery fitted to the measurement equipment 7, or indeed by energy generator means (e.g. means for transforming vibration into electrical energy, or indeed a tachometer generator that provides the speed of rotation of the main wheels).

Figure 3A:
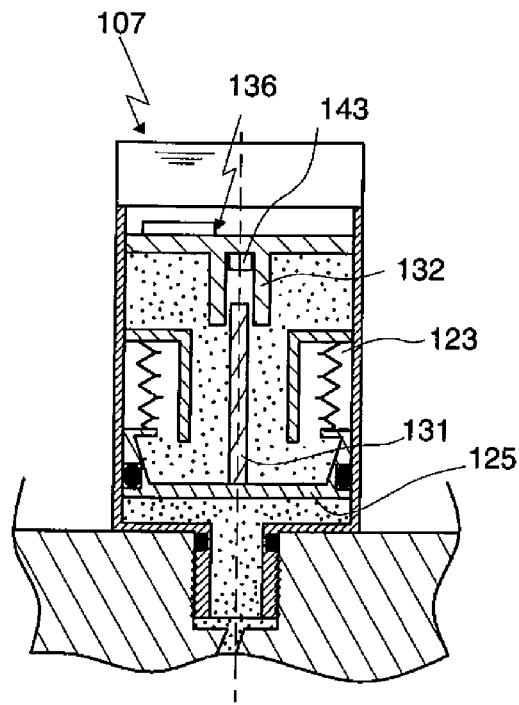
FIGS. 3a and 3b are longitudinal section views of pressure measurement equipment of the invention in a second embodiment and in a variant of the second embodiment.

Reference is made to FIG. 3a in which numerical references for elements in common have one hundred added thereto, the figure showing a second embodiment comprising measurement equipment 107 that no longer has a linear movement sensor but rather a contact detector 143. The contact detector 143 is placed at the end of a measurement element 132 and is for detecting contact with a rod 131 secured to a piston 125. The piston 125, the rod 131, and the contact detector 143 are arranged in such a manner that the rod 131 comes into contact with the contact detector 143 when the piston 125 is in a retracted position. The contact signal is then transmitted to an electrical module 136. Thus, in this second embodiment, a situation is detected in which the inflation pressure is greater than a predetermined threshold. By way of example, the measurement equipment may be dimensioned in such a manner that the contact signal is issued so long as the inflation pressure is greater than a minimum pressure below which it is appropriate to ensure a maintenance operation for reinflating the tire. The maintenance operation is thus decided on when the contact signal is no longer issued.

Figure 3B:
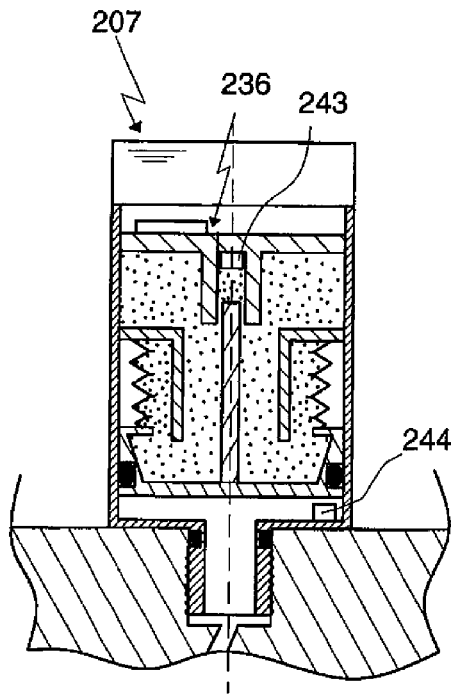

FIG. 3b shows a variant of the second embodiment of the measurement equipment 207 of the invention. In this variant, the enclosure equipment 207 is provided with a first contact detector 243, similar in arrangement and kind to the contact detector 143 described above, serving to issue a first contact signal to an electrical module 236, and with a second contact detector 244 delivering a second contact signal to the electrical module 236 indicating that the piston is in an extended position. Thus, in this variant of the second embodiment, a first situation is detected in which the inflation pressure is greater than a first predetermined threshold, and a second situation is detected in which the inflation pressure is less than a second predetermined threshold. By way of example, the measurement equipment may be dimensioned in such a manner that the first signal and the second signal are issued respectively when the inflation pressure is above and below a maximum pressure and above and below a minimum pressure, beyond which it is appropriate to call for a maintenance operation to deflate or to reinflate the tire.

Figure 4:
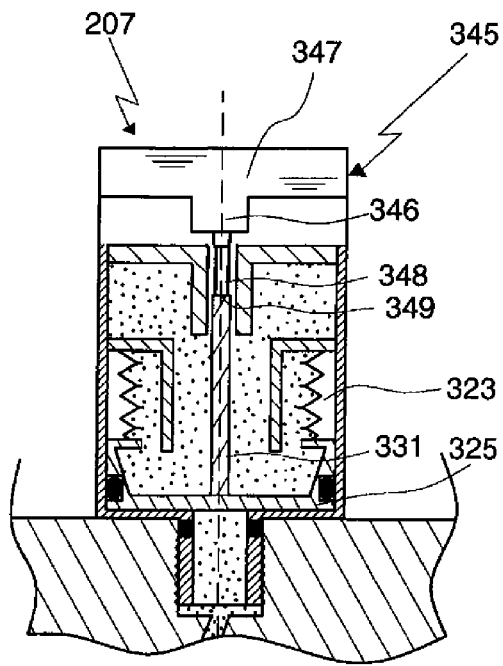
FIGS. 4 and 5 are longitudinal section views of pressure measurement equipment in third and fourth embodiments.

With reference to FIG. 4 and in a third embodiment, the measurement equipment 307 of the invention includes a dial comparator 345. The dial comparator comprises a body 346, a dial 347, and a comparator rod 348. The rod of the comparator 348 is in contact with a tip 349 of a rod 331 secured to the piston 325. The comparator rod 348 is arranged to slide in the body 346 to an extent that depends on the position of the tip 349 of the rod 331 and thus on the inflation pressure of a tire. The dial 347 has a scale and a pointer (not shown in the drawings) with the angular position of the pointer depending on the linear position of the rod and providing a visual indication that is representative of the inflation pressure of the tire.

Figure 5:
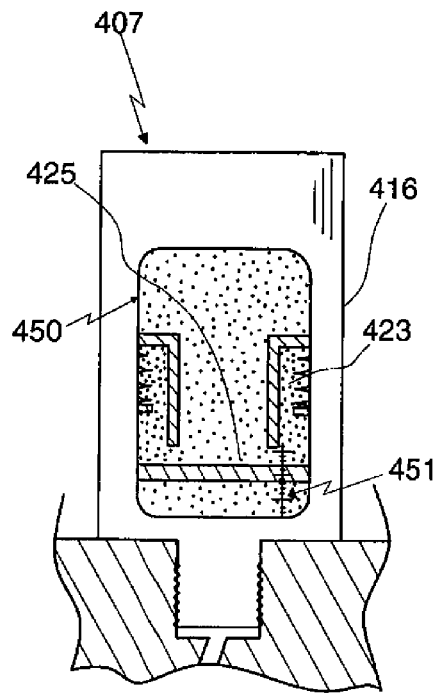

With reference to FIG. 5 and a fourth embodiment, measurement equipment 407 of the invention comprises a body 416 having a transparent window 450 (e.g. made of transparent plastics material) that is marked with a scale 451. The transparent portion 450 is arranged in such a manner that a piston 425 of position that depends on the inflation pressure of a tire is visible through the transparent portion 450, so that, depending on the position of the piston, the scale 451 provides an indication representative of the inflation pressure.

The measurement equipment of the invention in the third and fourth embodiments provides a visible indication of the inflation pressure that can be seen by an operator on the ground. It should be observed that in these embodiments, it is necessary for the measurement equipment to be mounted on a face of a rim that gives easy visible access to the equipment. In addition to its simplicity and its robustness, the measurement equipment in the third and fourth embodiments of the invention presents the advantage of not requiring any electrical power supply since it operates entirely mechanically.

The invention is not limited to the particular embodiments described above, but on the contrary covers any variant coming within the ambit of the invention as defined by the claims.

Although the measurement equipment is provided with bellows, it is possible to use other means for preventing gas exchange between the chambers in the body, e.g. one or more additional gaskets mounted on the piston.

Although particular position-identification means are described (a linear movement sensor, a contact detector, a dial comparator, a window), it is also possible to use other position-identification means in order to identify the position of the piston. In particular, it is possible to replace an LVDT sensor by any type of passive sensor of linear movement, which may be of inductive, capacitive, or potentiometer type, etc. It is also possible to replace the contact detector by a proximity detector. Finally, it is possible to replace the dial comparator or the window with other visual indicator means, e.g. an indicator that changes color depending on pressure (by way of example, provision could be made for an indicator that takes on a green color when the value of the inflation pressure is normal, and a red color when it is abnormally low).

Although particular arrangements are described for the position-indicator means, for the electrical module, for the antenna, and for other elements of the equipment, the invention naturally applies to other arrangements of such elements. For example, the coils and the rod of the LVDT may be positioned inside the chamber that is filled with inflation gas, or the electrical module may be situated in said chamber or in the chamber filled with the reference gas.

The invention claimed is:

1. Measurement equipment for measuring the inflation pressure of a tire of a vehicle wheel (1), the equipment comprising:
    a body (16) defining an internal volume;
    a communication orifice (19) for putting the inside volume of the body (16) into communication with an inflation chamber (6) situated between a rim (2) and a tire (4) of the wheel and containing an inflation gas;
    an indicator member (25; 125; 325) slidably mounted in the body (16) so as to define a gastight separation between a first chamber (26) containing a given quantity of a reference gas and a second chamber (27) into which the communication orifice (19) leads, such that the indicator member (25; 125; 325) is subjected to opposing pressures that exist in each of the chambers; and
    position-identification means (30; 143; 243, 244; 345; 451) for identifying the position of the indicator member in the body, the position-identification means including a sensor (30) for sensing the position of the indicator member.

2. Tire pressure measurement equipment according to claim 1, wherein the position-identification means comprise a window (450) in the body enabling the position of the indicator member to be viewed.

3. Tire pressure measurement equipment according to claim 1, wherein the position-identification means comprise a dial comparator (345) arranged on the body and including a reference mark and a pointer mechanically connected to the indicator member (325) so that the position of the pointer relative to the mark indicates the inflation pressure.

4. Tire pressure measurement equipment according to claim 1, wherein the position sensor (30) comprises a passive linear movable sensor of the inductor, or capacitor, or potentiometer type.

5. Tire pressure measurement equipment according to claim 1, wherein the position sensor (30) comprises a contact detector or a proximity detector.

6. Tire pressure measurement equipment according to claim 1, further including transmitter means (40, 41) for transmitting information generated by the position-identification means to a communications device (42) fitted to the vehicle or brought into the proximity of the vehicle.

7. Tire pressure measurement equipment according to claim 6, wherein the transmitter means (40, 41) include an antenna (40).

8. Tire pressure measurement equipment according to claim 1, wherein the indicator member (25; 125; 325) is secured to a bellows (23; 123; 323; 423) incorporated in the inside volume of the body.

* * * * *